United States Patent [19]
Braun et al.

[11] Patent Number: 5,092,954
[45] Date of Patent: Mar. 3, 1992

[54] DEVICES FOR MECHANICALLY APPLYING A FLEXIBLE MULTI-LAYER BODY MEMBER WHICH IS ADHERENT ON ITS ONE SIDE TO THE SURFACE OF A WORKPIECE

[75] Inventors: Moritz Braun, Zollikerberg; Jan Radlinsky, Rüschlikon, both of Switzerland

[73] Assignee: Gurit-Essex AG, Freienbach, Switzerland

[21] Appl. No.: 499,184

[22] Filed: Mar. 26, 1990

[30] Foreign Application Priority Data

Apr. 14, 1989 [DE] Fed. Rep. of Germany ....... 3912242

[51] Int. Cl.⁵ .................................. B32B 31/00
[52] U.S. Cl. .................................. 156/540; 156/539; 156/581; 156/584; 156/247
[58] Field of Search ............ 156/540, 584, 583.1, 156/583.3, 581, 542, 541, 539, 344, 247, 248, 249; 221/73

[56] References Cited

U.S. PATENT DOCUMENTS

| | | |
|---|---|---|
| 4,173,510 | 11/1979 | Tobey .................. 156/584 |
| 4,511,425 | 4/1985 | Boyd et al. ............. 156/542 X |
| 4,556,443 | 12/1985 | Moya .................. 156/542 X |
| 4,648,501 | 3/1987 | Grant .................. 198/397 |
| 4,855,012 | 8/1989 | Sumi .................. 156/584 |
| 4,870,251 | 9/1989 | Anemaet ............... 156/583.3 X |
| 4,927,479 | 5/1990 | Bock .................. 156/583.1 X |

Primary Examiner—David A. Simmons
Assistant Examiner—J. Sells
Attorney, Agent, or Firm—Tarolli, Sundheim & Covell

[57] ABSTRACT

The device serves for mechanically applying to the surface of a work piece a flexible multi-layer body member which is adherent on it one side and is composed of a supporting layer, an adhesive layer and a draw-off protection foil covering said adhesive layer.

Said device comprises the following partial devices:
(a) a supporting table for supporting said multi-layer body member;
(b) separating device for separating said protection foil from said multi-layer body member in a marginal zone;
(c) a draw-off device for drawing off said protection foil from said multi-layer body member; and
(d) a transporter provided with a vacuum gripper for lifting said multi-layer body member off from said supporting table, for moving it past said draw-off device, and for depositing it—if necessary after heating it by means of a heating device—onto the surface of said work piece.

Said vacuum gripper consists of a tampon made of a deformable soft elastic material and has a convex working surface which is provided with depressions acting as suction cups and connected by ducts with a vacuum generator.

3 Claims, 4 Drawing Sheets

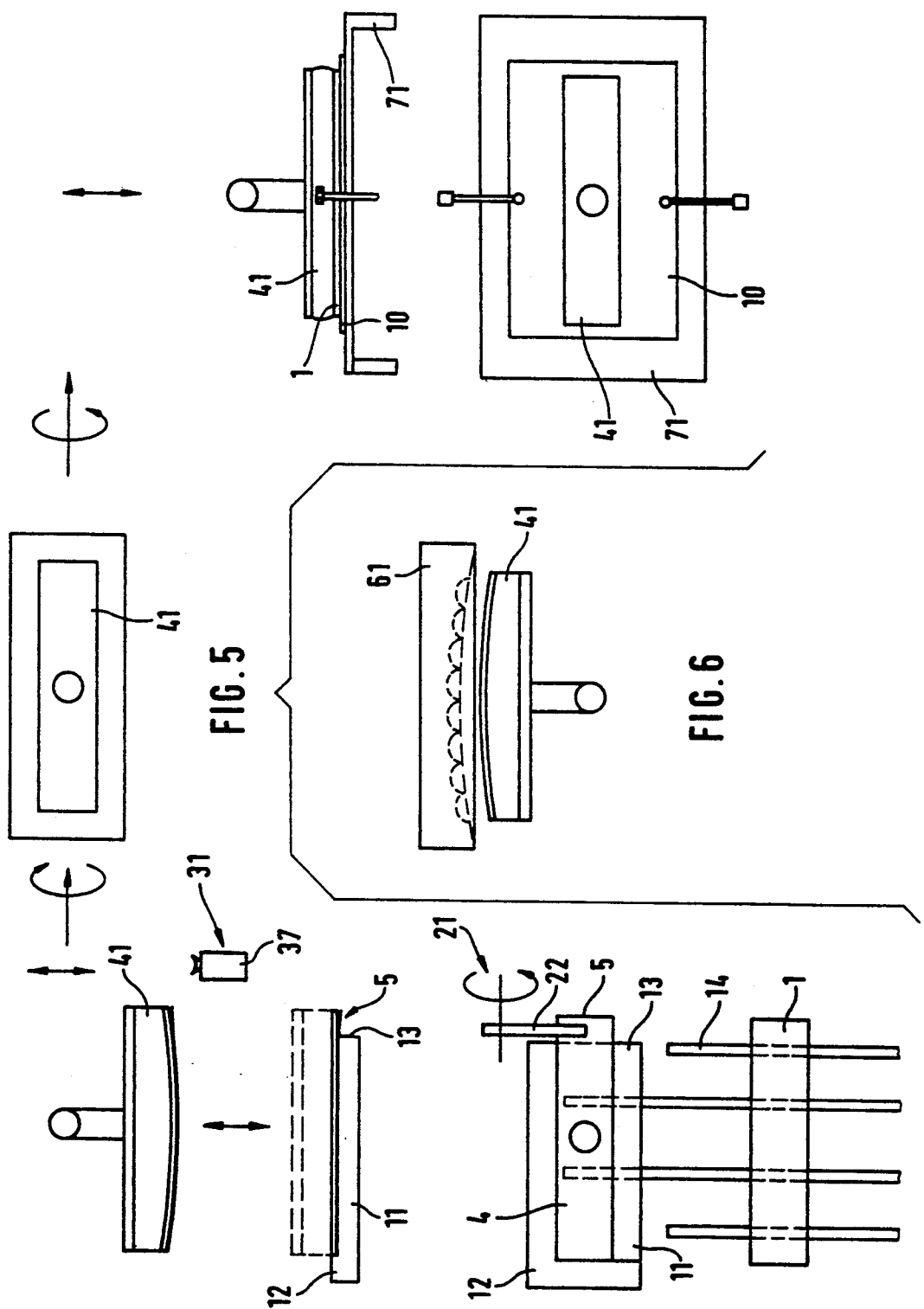

DEVICES FOR MECHANICALLY APPLYING A FLEXIBLE MULTI-LAYER BODY MEMBER WHICH IS ADHERENT ON ITS ONE SIDE TO THE SURFACE OF A WORKPIECE

FIELD OF THE INVENTION

This invention refers to devices for mechanically applying to the surface of a work piece a flexible multi-layer body member which is adherent on it one side and comprises a supporting layer, an adhesive layer and a draw-off protection foil covering said adhesive layer.

BACKGROUND OF THE INVENTION

It is known to use special stiffening members for stiffening sheet metal, molded plastic articles, and the like, especially of car body parts. Generally, said stiffening members are flexible multi-layer body members which are adherent on their one side and may be composed of:

an actual stiffening layer, in particular one comprising a glass cloth bound by means of a thermosetting resin; and an adhesive layer, in particular one comprising a thermosetting resin.

In the interest of a simple application of the multi-layer body members, the adhesive layer generally is made to have a tacky surface, so that the stiffening member, once applied, is sticking to its place until the heat treatment is accomplished.

However, this requires that the tacky surface of the adhesive layer is protected until the multi-layer body members are used in order to protect them from contamination and to allow stacking them.

According to the status of the art, such a protection may be performed by applying a protection foil, especially consisting of a suitably treated paper, to the multi-layer body member and removing said protection foil immediately before the application of the stiffening member.

One disadvantage of using stiffening members of this kind is that removing the protection foil requires a supplemental labour-intensive operation step which so far could not be accomplished mechanically. This was particularly unwelcome in the motor car industry where there is the trend for automation of all operation steps.

In order to avoid said supplemental operation step, it was proposed in the DE-OS 37 20 267 to accomplish said protection by covering the adhesive layer with a heat shrinking film which is regularly clearing said adhesive layer upon shrinking, e.g. by providing it with slits which widen to form openings upon heat curing thereby clearing a considerable portion of said adhesive layer.

However, this solution has the disadvantage that only a portion of the adhesive layer is cleared. For this reason the adhesion of the stiffening member is less than in the case of a full-surface bonding.

Ultimately, it was also proposed to use multi-layer body members which, instead of an adhesive layer having a tacky surface, comprise a layer of hot-melt adhesive that is not tacky at room temperature but becomes tacky under the influence of heat only.

Such multi-layer body members also have the disadvantage of a poor adhesion.

Another unsolved problem was that of applying the stiffening member, free from voids, to the surface to be stiffened. This is absolutely necessary, since any formation of bubbles between the adhesive layer and the surface to be stiffened is considerably lowering the stiffening effect due to reduction of the effective bonded area.

OBJECTS OF THE INVENTION

It is the primary object of the invention to solve the above mentioned problems by providing devices for applying multi-layer body members of the abovementioned kind to the surface of a work piece mechanically and free from voids.

It is a further object of the invention to provide a vacuum gripper for holding a flexible body which is adherent on its one side onto a surface while avoiding any bubble formation.

SUMMARY OF THE INVENTION

In meeting these and other objects by the invention, two things are particularly essential, i.e.:

that the multi-layer body member, when applied to the surface to be stiffened, has a convex form so that it contacts the surface of the work piece first in its middle and thereafter progressively outwardly, whereby any bubble formation is avoided; and that, if multi-layer body members are used which comprise a protection foil to be drawn off, said protection foil is loosened from the adhesive layer in a marginal zone before the actual drawing-off, in order to allow thereafter a drawing-off by means of vacuum.

BRIEF DESCRIPTION OF THE DRAWINGS

In the following, some embodiments of the invention are further described with reference to the attached drawings. In the drawings.

FIG. 5 shows a side view of the functional schematic of a device for the handling of multi-layer body members of Type 1;

FIG. 6 shows a top view of the device of FIG. 5;

DESCRIPTION OF SOME PREFERRED EMBODIMENTS

All multi-layer body members 1 shown in FIGS. 1 to 4 (Types 1 to 3) comprise a supporting layer 2, preferably consisting of a glass cloth bound by means of a thermosetting resin.

Figure 1:
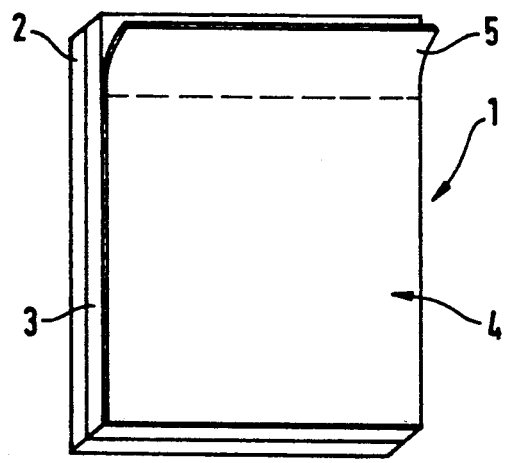
FIG. 1 shows the first one of the abovementioned three types of multi-layer body members which are adherent on their one side, i.e. the type having a protection foil to be drawn off (Type 1)
Figure 2:
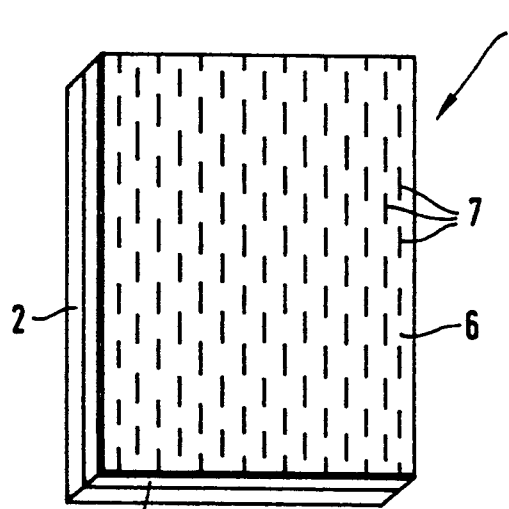
FIGS. 2 and 3 show the second one of the abovementioned three types of multi-layer body members which are adherent on their one side, i.e. the type having a protection foil consisting of a slitted shrink film (Type 2), FIG. 2 showing the situation before and FIG. 3 after heat treatment.
Figure 3:
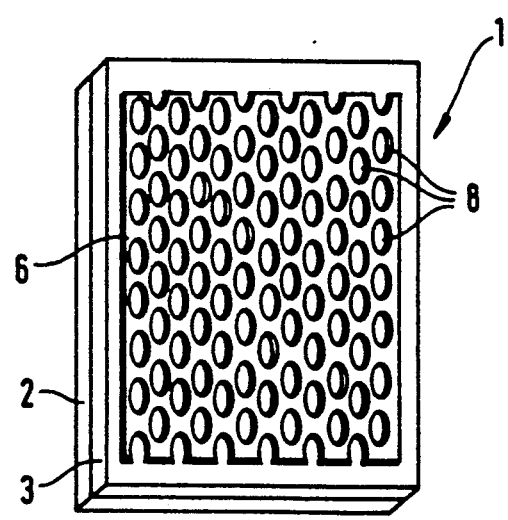

An adhesive layer 3, which is heat curable and is tacky at room temperature, is arranged on said supporting layers 2 for the multi-layer body members of FIGS. 1 to 3 (Types 1 and 2). For the multi-layer body member of FIG. 1 (Type 1) said adhesive layer 3 is protected by a protection foil 4, preferably made of an impregnated paper, which is to be drawn off when the stiffening member is used. In FIG. 1 said protection foil 4 is already loosened from said adhesive layer 3 in a marginal zone 5.

For the multi-layer body member of FIGS. 2 and 3 (Type 2), the adhesive layer 3 is covered by a shrink film 6 provided with slits 7 (FIG. 2). Upon heat-treating the adhesive layer 3, the film 6 shrinks. The slits 7 widen to form openings 8 (FIG. 3) which clear a considerable portion of the adhesive layer 3.

Figure 4:
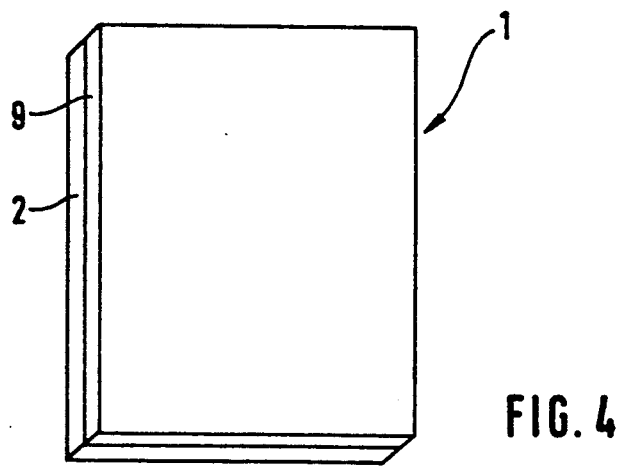
FIG. 4 shows the third one of the abovementioned three types of multi-layer body members which are adherent on their one side, i.e. the type having a layer of hot-melt adhesive as adhesive layer (Type 3)

For the multi-layer body member of FIG. 4 (Type 3), a layer of hot-melt adhesive 9, which is non-tacky at room temperature, is arranged on the supporting layer 2, so that a protection foil may be omitted.

The device shown in FIGS. 5 and 6 serves for handling multi-layer body members of Type 1 which are explained with reference to FIG. 1, and is operating as follows:

The multi-layer body members 1 are individually fed, with the protection foil 4 downward and the supporting layer 2 upward, by a transporter 14 to the supporting table 11. Said supporting table 11 comprises one or more positioning steps 12 which allow the multi-layer body to freely project in a marginal zone 5 beyond the edge 13 of the supporting table 11. Said multi-layer body member 1 is fastened to the supporting table 11 by means of the vacuum gripper 41 described below.

Now, by means of a separating device 21 comprising at least one bumping tool 22, the multi-layer body member 1 is knocked in the free marginal zone 5 from the side of the supporting layer 2. Thereby, in the said marginal zone 5 the protection foil 4 loosens from the adhesive layer 3. The separating device 21 is preferably a paddle wheel the paddles of which act as bumping tools 22.

Alternatively, the separating device 21 may be arranged in the area of the transporter 14, instead of in the area of the supporting table 11. In this case, care is to be taken that the multi-layer body members 1 are carried on the transporter 14 with their marginal zone 5 unsupported and that they are so tightly hold that they can be knocked.

After removal of the protection foil 4 in said marginal zone 5, the multi-layer body member 1, which was picked up by the vacuum gripper 41 from the side of the supporting layer 2, is carried further by said vacuum gripper 41 which is explained in detail with reference to FIGS. 7 to 9.

The multi-layer body member 1, which has taken the convex form of the vacuum gripper 41, is now moved relatively to a draw-off device 31, which is a suction element 33 and which draws the protection foil 4 off from the multi-layer body member 1 by means of vacuum, starting with the separated marginal zone 5.

In the shown embodiment of the device according to the invention, said suction element consists of a stationary suction bar 37 which takes up and firmly holds the separated marginal zone 5 of the protection foil 4, so that the latter is drawn off by the vacuum gripper 41 from the adhesive layer 3 when the multi-layer body member 1 is conveyed further.

Alternatively, the suction element can be a movable suction cylinder which is moved over the multi-layer body member 1, which latter is either kept stationary or moved in the opposite direction, thereby rolling on said multi-layer body member 1.

The vacuum gripper 41 is part of a transporter (not shown) which conveys the multi-layer body member 1 from the supporting table 11 to the surface of the work piece 10.

If multi-layer body members of Types 2 and 3, shown in FIGS. 2 to 4, are handled, the separating device 21 and the draw-off device 31 are omitted.

The multi-layer body members 1 are now conveyed to a heating device 61. There, the multi-layer body members of Types 1 and 2 are heated to a point where, after application of them to the work piece, heat-curing of the adhesive layer 3 takes place. For multi-layer body members of Type 2, additionally the abovementioned formation of openings 8 and the clearing of a portion of the adhesive layer 3 takes place. For multi-layer body members of Type 3, the layer of hot-melt adhesive 9 is melted.

In the shown embodiment of the device according to the invention, the heating device 61 is an infrared radiator and is stationary; alternatively, it can be a microwave radiator or, for heating electrically conductive multi-layer body members, an induction heating.

However, there is no need to arrange the heating device 61 stationaryly, but it can be part of the transporter and move on-line with the multi-layer body member 1, independently of the heating principle. In particular, the heating device 61 may be part of the vacuum gripper 41.

Thereafter, the multi-layer body member 1 having their adhesive layer 3 and 9, respectively, activated is applied to the surface of the work piece 10 to be reinforced. The latter is preferably fastened to a work piece holder by means of a quick-action gripping device 71. As also explained in detail with reference to FIGS. 7 to 9, the application of the multilayer body member 1 to the work piece 10 takes place first in the middle of said multi-layer body member 1 and is progressively extending outwardly upon further pressing the vacuum gripper 41 against said work piece 10.

After its application, the multi-layer body member 1 is pressed off from the vacuum gripper 41, if desired after expiration of a certain pressing time, by means of compressed air. Thereafter, the cycle can start again.

Figure 7:
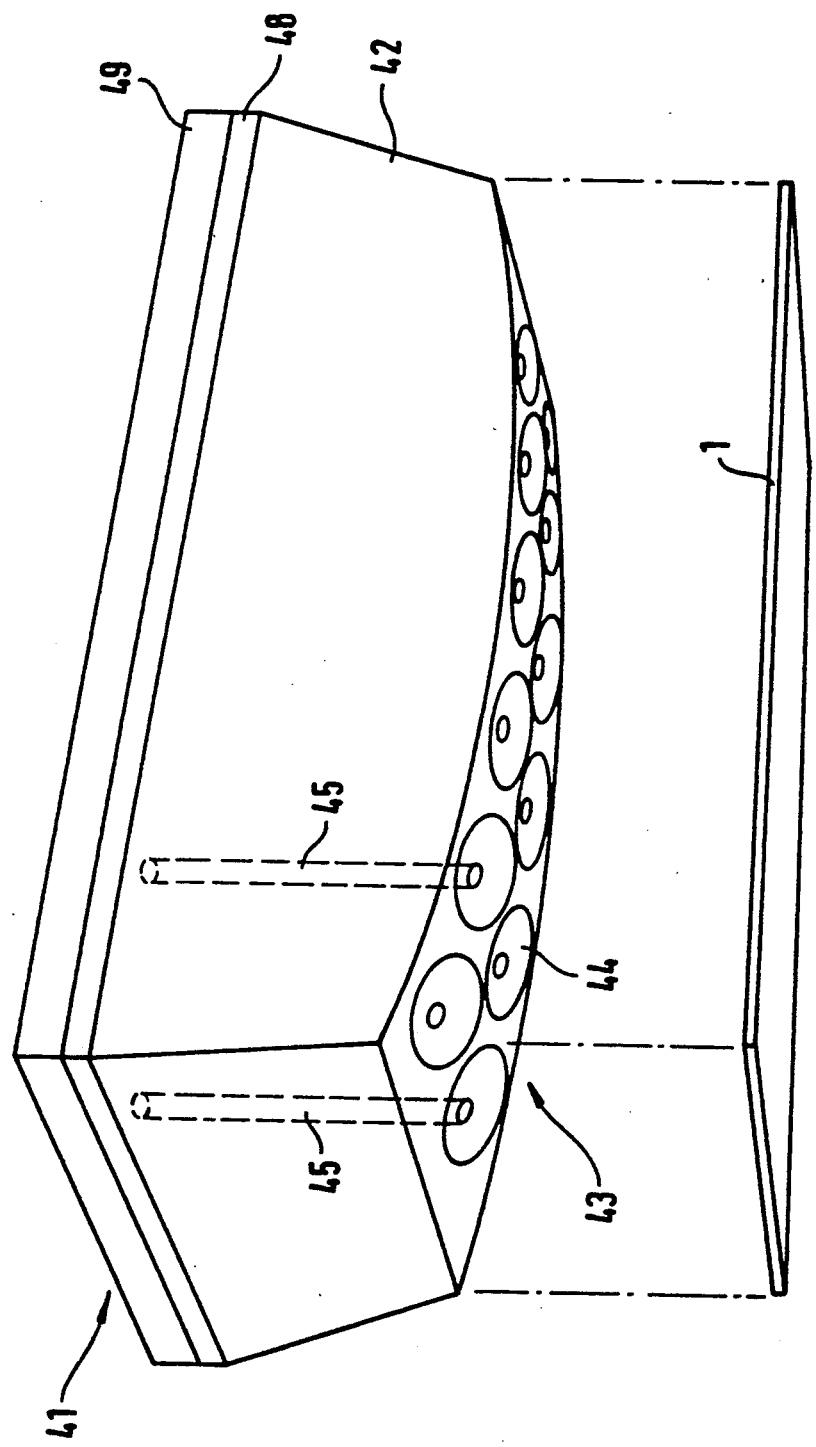
FIG. 7 shows a perspective view of a vacuum gripper according to the invention.
Figure 8:
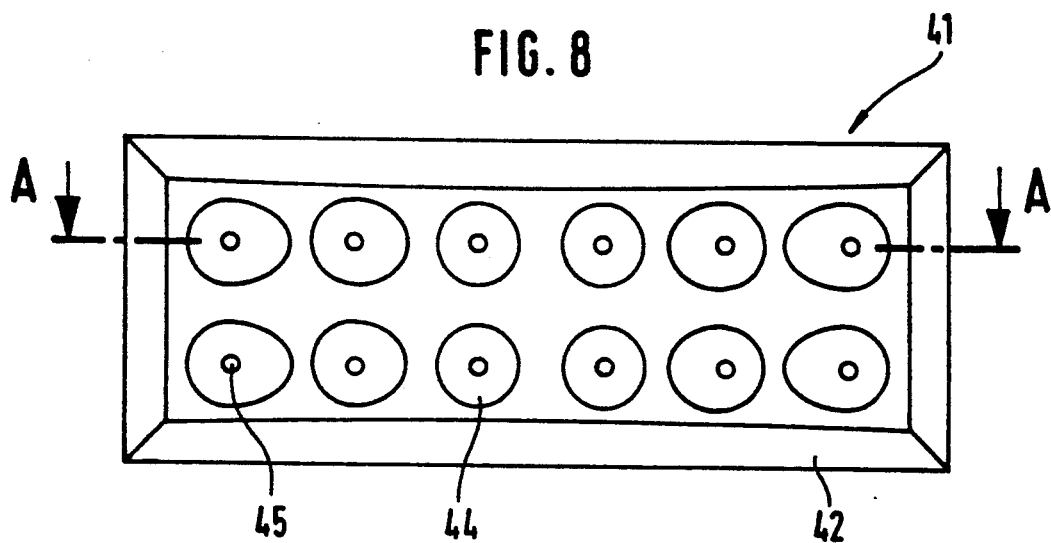
FIG. 8 shows a bottom view of the vacuum gripper of FIG. 7.
Figure 9:
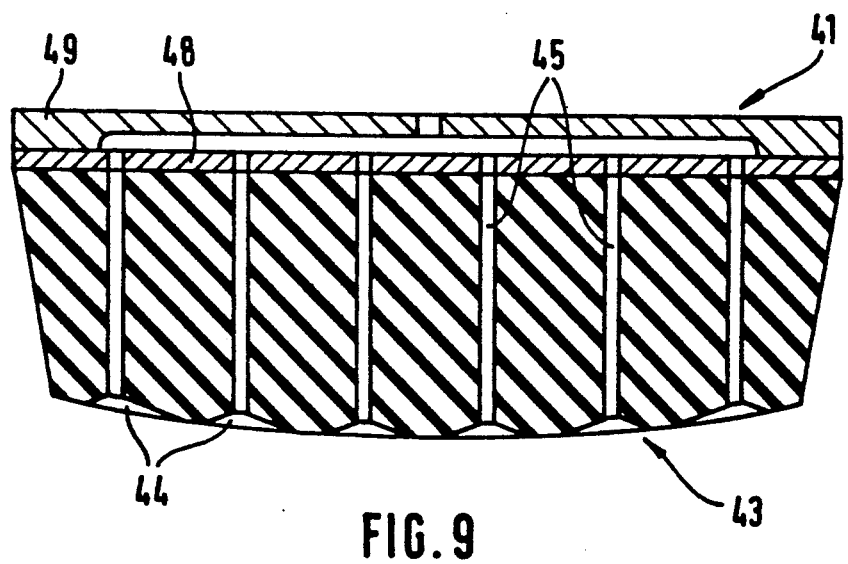
FIG. 9 shows a sectional view along the line A—A in FIG. 8.

The vacuum gripper 41 shown in FIGS. 7 to 9 consists of a tampon 42 made from a resilient soft-elastic material and has a convex working surface 43. The tampon 42 is bonded to a mounting plate 48. The latter is in turn fixed to a vacuum plate 49 which can be connected to a vacuum generator (not shown) and, if desired, also to a pressure generator (not shown).

Depressions 44 acting as suction cups are provided in the working surface 43 of said tampon 42. They are connected to the vacuum plate 49 by means of ducts 45 penetrating the mounting plate 48.

In operation, the tampon 42 is now lowered onto the multi-layer body member 1 located on the supporting table (not shown), and is drawn to the working surface 43 by means of vacuum. Thereby, the multi-layer body member 1 takes the same convex form as the working surface 43.

Due to said convex form, application of the heated multi-layer body member 1 to the surface of the work piece 10 takes place first in the middle of said multilayer body member 1 and is progressively extending outwardly upon further pressing. In this manner, any bubble formation is avoided with certainty, even with short cycle times.

In order to accelerate pushing-off the multi-layer body member 1 from the tampon 42, preferably a pressurized medium from a pressure generator is now admitted to the vacuum plate 49.

Alternatively, the vacuum gripper 41 may be designed to have two kinds of ducts 45, one of which being connectable to a vacuum generator and the other being connectable to a pressure generator.

What we claim is:

1. A device for mechanically applying to the surface of a workpiece a flexible multi-layer body member, which is adherent on one side and is composed of a supporting layer, an adhesive layer, and a protection foil to be drawn off said adhesive layer, said device comprising:
   a supporting table for supporting said multi-layer body member;
   a separating device for loosening said protection foil from said multi-layer body member in a marginal zone, said separating device comprises at least one bumping tool for knocking against an unsupported marginal zone of said multi-layer body member from the side of said supporting layer and thereby loosening said protection foil in said marginal zone from said adhesive layer, said separating device being a paddle wheel, the paddles of which act as said bumping tool;
   a draw-off device for drawing off said protection foil from said multi-layer body member; and
   a transporter comprising a vacuum gripper for lifting off said multi-layer body member from said supporting table, moving it past said draw-off device, and depositing it onto the surface of said workpiece.

2. A device according to claim 1, in which said supporting table comprises at least one trip dog which allows said multi-layer body member to freely project in said marginal zone beyond the edge of said supporting table.

3. A device according to claim 1, in which a transporter is superposed to said supporting table for individually feeding said multi-layer body members to said supporting table, thereby holding them so as to create an unsupported marginal zone, and in which said separating device is acting onto said multi-layer body members during their transportation.

* * * * *